United States Patent [19]

Kahn

[11] Patent Number: 4,898,348

[45] Date of Patent: Feb. 6, 1990

[54] DOCKING SYSTEM FOR SPACECRAFT

[75] Inventor: Jon B. Kahn, League City, Tex.

[73] Assignee: The United States of America as represented by the Administrator of the National Aeronautics and Space Administration, Washington, D.C.

[21] Appl. No.: 292,121

[22] Filed: Dec. 30, 1988

[51] Int. Cl.⁴ ............................................... B64G 1/64
[52] U.S. Cl. ................................................. 244/161
[58] Field of Search .................. 244/158 R, 159, 160, 244/161, 162, 75 R; 166/338, 340, 341, 342, 343, 349; 405/188, 189, 192

[56] References Cited

U.S. PATENT DOCUMENTS

| | | | |
|---|---|---|---|
| 3,391,881 | 7/1968 | Maltby | 244/1 |
| 3,443,773 | 5/1969 | Blumrich et al. | 244/1 |
| 3,608,848 | 9/1971 | Canter et al. | 244/1 |
| 3,753,536 | 8/1973 | White | 244/1 |
| 3,820,741 | 6/1974 | Ratcliff | 244/1 SD |
| 3,893,573 | 7/1975 | Fletcher et al. | 244/161 |
| 4,219,171 | 8/1980 | Rudmann | 244/161 |
| 4,637,272 | 1/1987 | Teske et al. | 244/75 R |
| 4,718,709 | 1/1988 | Myers et al. | 244/161 |

OTHER PUBLICATIONS

Faget, European Patent Application, #0196793, Oct. 8, 1986.
Boeing Space Station, Brochure.

*Primary Examiner*—Galen Barefoot
*Attorney, Agent, or Firm*—Russell E. Schlorff; John R. Manning; Edward K. Fein

[57] ABSTRACT

A mechanism for the docking of a space vehicle to a space station where a connection for transfer of personnel and equipment is desired. The invention comprises an active docking structure on a space vehicle 10 and a passive docking structure on a station 11. The passive structure includes a docking ring 50 mounted on a tunnel structure 35 fixed to the space station. The active structure including a docking ring 18 carried by actuator-attenuator devices 20, each attached at one end to the ring 18 and at its other end in the vehicle's payload bay 12. The devices 20 respond to command signals for moving the docking ring 18 between a stowed position in the space vehicle to a deployed position suitable for engagement with the docking ring 50.

The devices 20 comprise means responsive to signals of sensed loadings to absorb impact energy and retraction means for drawing the coupled space vehicle and station into final docked configuration and moving the tunnel structure to a berthed position in the space vehicle 10. Latches 60 couple the space vehicle and space station upon contact of docking rings 18 and 50 and latches 41-48 establish a structural tie between the spacecraft when retracted.

11 Claims, 4 Drawing Sheets

DOCKING SYSTEM FOR SPACECRAFT

ORIGIN OF THE INVENTION

The invention described herein was made by an employee of the United States Government and may be manufactured and used by or for the Government of the United States of America for governmental purposes without the payment of any royalties thereon or therefor.

RELATED APPLICATIONS

U.S. patent application, Ser. No. 07/292123 filed Dec. 30, 1988 for "Docking Mechanism For Spacecraft" and U.S. patent application, Ser. No. 07/292131, filed Dec. 30, 1988 for "Smart Tunnel Docking Mechanism" are related applications.

1. Field of the Invention

This invention relates generally to docking mechanisms, and more particularly to docking systems for spacecraft which include pressurizeable structures for accommodating the in-flight transfer of personnel and equipment and systems for attenuating docking impact.

2. Background Art

The in-flight docking of spacecraft, such as the space shuttle orbiter vehicle with a space station, involves the operation of many complex systems In addition to the guidance and propulsion systems which are used by a space shuttle orbiter in making a docking approach to the space station, there must be provided cooperative coupling mechanisms on both the space orbiter and the space station, a shock absorbing and attenuation system for reducing the shock of docking impact, a means for sustaining tension loads in holding the spacecraft together after initial engagement, and a means for retracting the spacecraft into a final docked configuration There is also frequently a requirement for a pressurizeable transfer structure for accommodating the in-flight transfer of personnel and equipment. Heretofore, docking structures which have been used or proposed for spacecraft docking, including structures with accommodations for transfer of personnel and equipment, are usually in the form of rigid structures which require considerable support structure of large size and mass and relatively massive high-energy shock attenuation devices with relatively small attenuation stroke. In most instances, coupling mechanisms and retraction mechanisms are mounted on the shuttle orbiter in the payload bay which are of relatively large size and weight and occupy a great deal of space which would otherwise be available for the transport of cargo. While many proposed docking mechanisms mount much of the docking mechanisms including retraction means on the space station to alleviate the cargo space problems, the retraction mechanisms also mounted thereon require maintenance in the space environment which is not an economical preference.

U.S. Pat. No. 4,219,171 and U.S. Pat. No. 3,391,881 disclose means for docking a space vehicle to another space vehicle or satellite wherein arms which align coupling mechanisms and reduce docking impact are projected out from one space vehicle for docking engagement with the other. Retraction means are included.

U.S. Pat. No. 3,753,536 discloses a spacecraft docking mechanism including sets of shock absorbers on a carrier space vehicle and a satellite vehicle for reducing docking impact. After contact is made, secondary engagement devices are brought together by a retraction mechanism mounted in the carrier space vehicle.

U.S. Pat. No. 3,608,848 discloses a mechanism for docking two spacecraft together and for attenuating the docking impact by means of cooperating bumper mechanisms on each of the spacecraft. After initial contact, docking latches secure the vehicles together and an assembly latch provides for holding the vehicles a distance apart or for drawing them nearer to each other.

U.S. Pat. No. 3,443,773 discloses spacecraft docking structure that includes a circular opening in one spacecraft with a prismatic structure therein for receiving an incoming element, in the form of a pyramidal structure mounted on the other. Energy absorbing pads are provided between the mating surfaces of the first and second spacecraft.

All of the above are characterized by having impact attenuation means with a very limited attenuation stroke and associated support structures of relatively large size and weight. In addition the functions of import attenuation and retraction of spacecraft to a final docked position are provided by separate means which increases the size, complexity and weight of the docking systems.

SUMMARY OF THE INVENTION

The invention is a docking mechanism for the docking of a space vehicle, such as the space shuttle orbiter, to the space station or another space vehicle, and one which is particularly suitable where a connecting tunnel structure for in-flight transfer of personnel and equipment between the docked spacecraft is a requirement. The invention comprises an active docking structure which is mounted on a first space vehicle and a passive docking structure which is mounted on the space station or a second space vehicle. The passive docking structure comprises a docking member, preferably a docking ring, which is mounted on the space station It may be mounted on a tunnel structure which is fixed in sealing relationship to the space station about an appropriate hatch thereof. The active docking structure on the space shuttle orbiter includes an active docking member, preferably a second docking ring. The second docking ring is carried by actuator means, in the form of a plurality of linear actuator-attenuator devices, each of which is pivotally attached at one end to the active docking ring and at its other end to a wall of a payload bay in the space shuttle orbiter. The actuator means are adapted for moving the active docking ring between a stowed position in the payload bay of the space vehicle on which it is mounted to a fully deployed position outside the payload bay where it presents a docking interface disposed for docking engagement with the docking ring on the passive docking structure of the space station or other space vehicle.

The plurality of linear actuator-attenuator devices which comprise the actuator means for deployment of the active docking ring also comprise an impact attenuation means for absorbing the docking impact of spacecraft upon contact of the active and passive docking members. The attenuation stroke of the attenuation means for absorbing impact energy is limited by the distance between the deployed position and a position which places the attenuators in a relatively unstable configuration (where any of the attenuators is approximately less than 40 degrees to the coplanar position), or a position which interferes with other spacecraft structure.

A retraction means for drawing the coupled space vehicle and space station together or coupled spacecraft together is also provided by the same actuator-attenuator devices which are utilized for docking ring deployment and docking impact attenuation. The actuator-attenuator devices are responsive to signals of sensed loadings at the time of impact to linearly compact to absorb impact energy and also responsive to electrical command signals for effecting their linear expansion or contraction in order to deploy the active docking ring member or to retract the coupled spacecraft into a final docked configuration. In passive docking structures which include a tunnel structure, the tunnel structure is movable by the retraction means to a berthed position relative to the first space vehicle wherein the tunnel structure is adapted for sealing connection with the first vehicle to establish a tunnel connection which is suitable for the in-flight transfer of personnel, cargo and equipment.

BRIEF DESCRIPTION OF THE INVENTION

FIG. 1 is a fragmentary sectional view of a space shuttle orbiter approaching a docking module of a space station wherein both are equipped with cooperative docking mechanism components of the invention and wherein a docking ring of the space shuttle orbiter docking mechanism is shown in a fully extended position suitable for initial contact with the space station and in intermediate and fully retracted positions illustrated by broken lines;

DETAILED DESCRIPTION OF THE INVENTION

Figure 1:
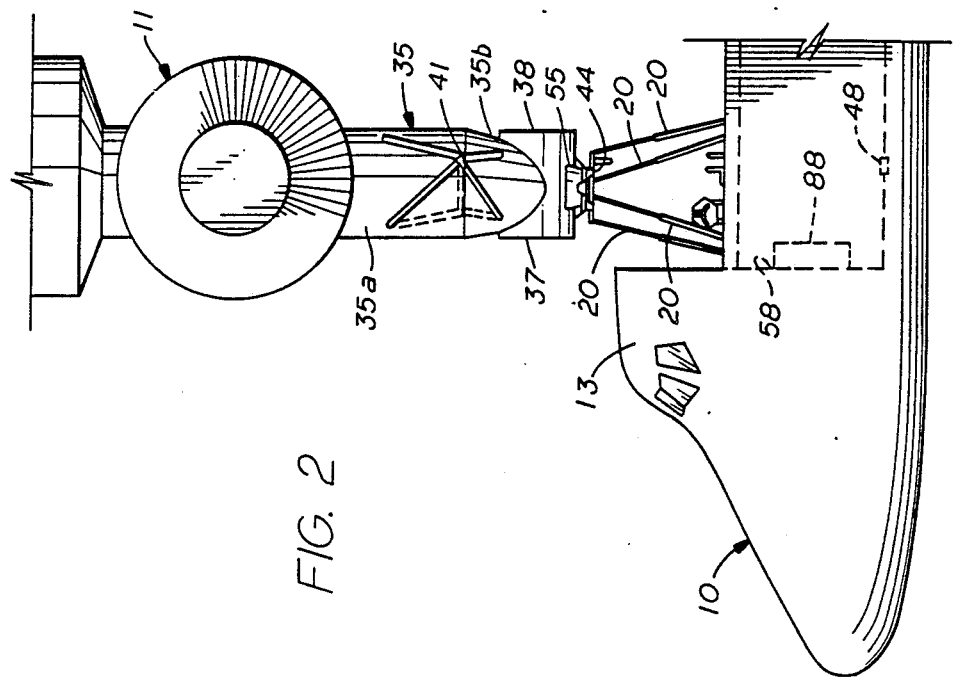
Figure 2:
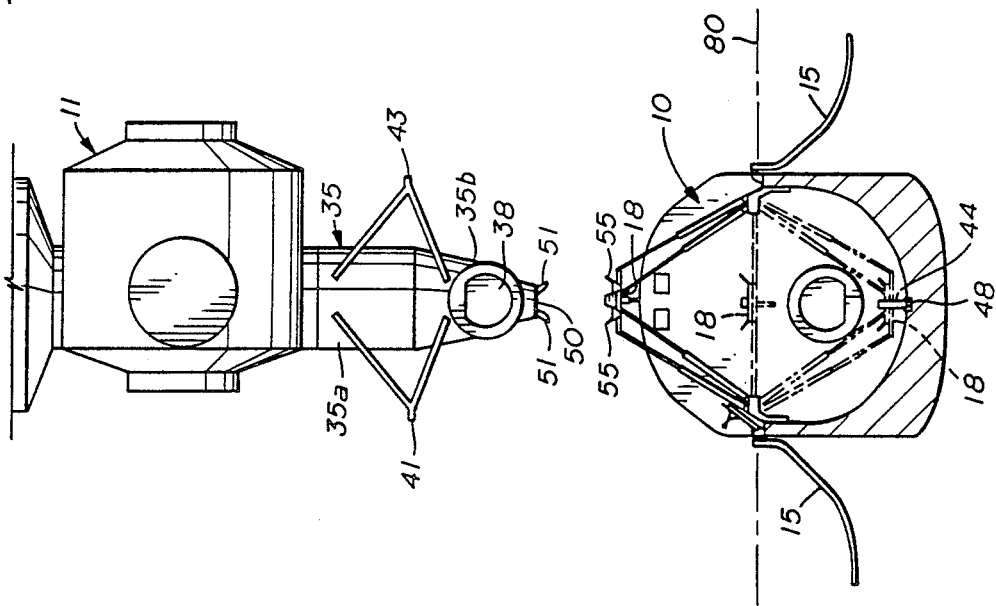
FIG. 2 is a fragmentary side view of the space shuttle orbiter and space station equipped with the present invention which is shown in its configuration at the time of initial contact of the space shuttle orbiter with the space station.

Referring more particularly to the drawings, there is shown in FIG. 1 a space shuttle orbiter 10 approaching a space station 11 for the purpose of docking thereto. The space shuttle orbiter 10 is shown in a transverse cross section through the payload bay 12 of the vehicle looking towards the crew compartment 13. The payload bay doors 15 have been opened wide to expose the docking mechanism components of the invention which are mounted on the space shuttle orbiter.

Figure 6:
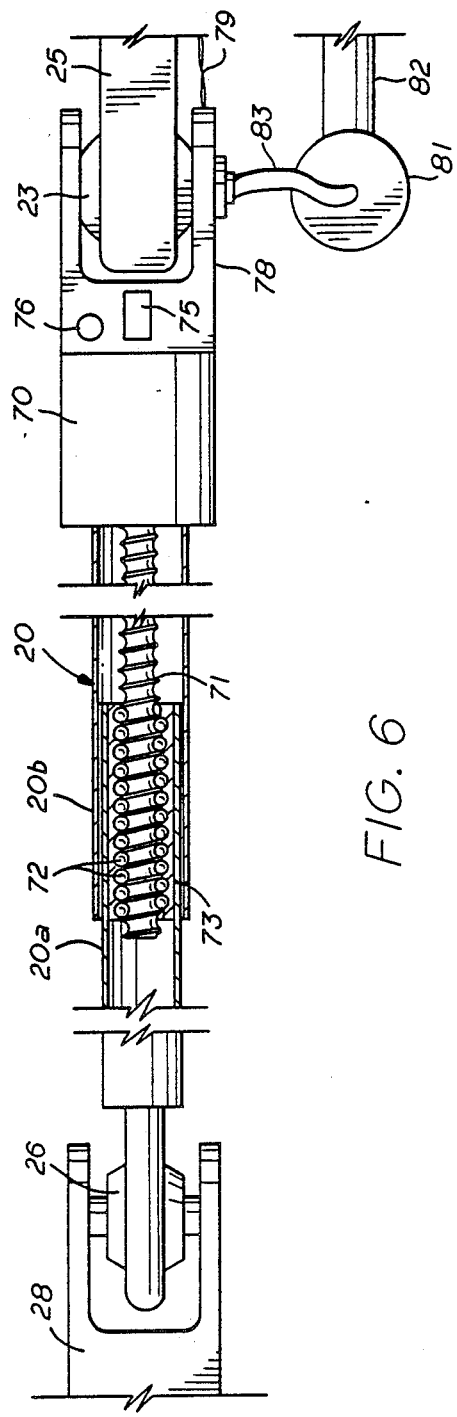
FIG. 6 is a view partly in cross section illustrating structural details of one of the actuator-attenuator devices of the invention.
Figure 7:
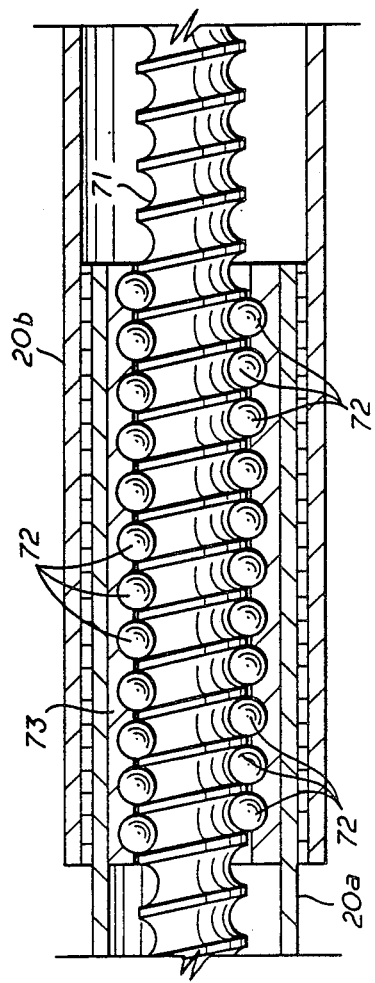
FIG. 7 is an enlarged view in cross section of the ball screw drive components of the actuator-attenuator device of FIG. 6.

The docking mechanism components mounted on the space shuttle orbiter 10 comprise a docking ring 18 which provides the docking interface with the space station. The docking ring 18 is connected to and carried by a plurality of actuator-attenuator devices 20, preferably eight in number. The actuator-attenuator devices 20, best shown in FIGS. 6 and 7, are linear actuators comprised of two telescopic members 20a, 20b controlled in relative telescopic movement by ball-screw drive mechanisms to be hereinafter described in greater detail.

Figure 3:
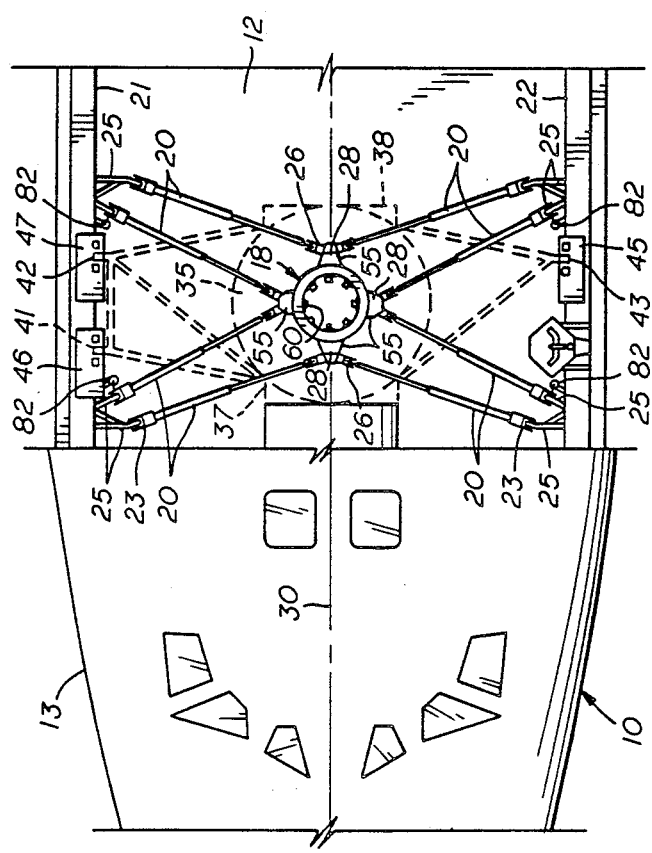
FIG. 3 is an enlarged view end view of space shuttle orbiter components of the invention and a portion of the space shuttle orbiter with a tunnel structure mounted on the space station illustrated in broken lines and showing the orientation of the invention with respect to the payload bay of the space shuttle orbiter.
Figure 5:
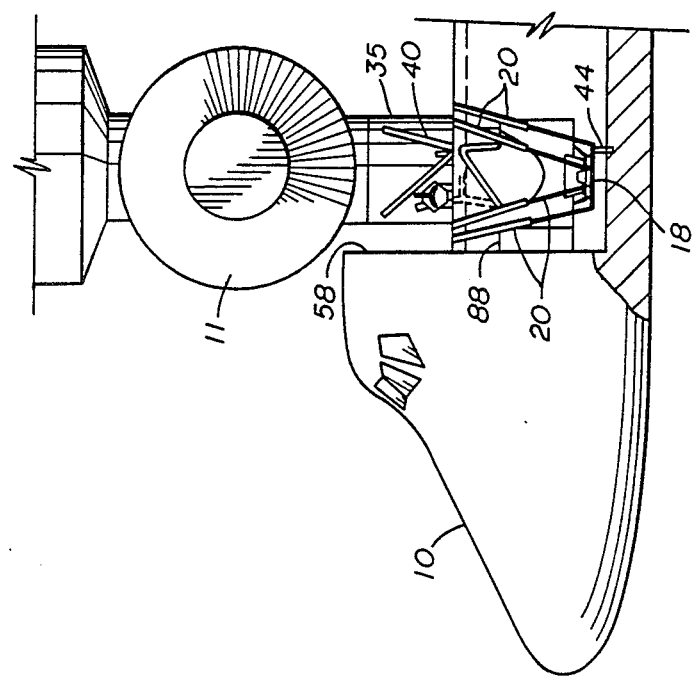
FIG. 5 is a fragmentary side view of the space shuttle orbiter and space station equipped with the present invention which is shown in its configuration when the tunnel structure on the space station is berthed in the payload bay of the space shuttle orbiter and the orbiter and space station are in final docked configuration.

The actuator-attenuator devices 20 are each connected at one end by a swivel connection 23 with different ones of a plurality of brackets 25 which are mounted on the inner walls 21, 22 of the payload bay. As best seen in FIG. 3, four of the actuator-attenuators 20 are mounted to brackets on the wall 21 and the remaining four are mounted to brackets on the wall 22. At their other ends, each of the actuator-attenuators 20 is connected by a swivel connection 26 to a bracket 28 provided on the docking ring 18. There are four such brackets 28, provided in equiangular ninety degree spacing about the docking ring 18 with two of the brackets 28 disposed substantially along the longitudinal axis 30 of the space vehicle and the remaining pair on an axis disposed transversely thereto.

The four wall brackets 25 on each wall 21, 22 are located in spaced pairs, wherein the brackets 25 in each pair are relatively closely spaced and the bracket pairs themselves being relatively widely spaced in the longitudinal direction of the space shuttle orbiter. With respect to their longitudinal spacing, the outer pair of actuator-attenuators 20 are connected to the pair of brackets 28 located on the axis 30 and the inner pair are connected to the bracket 28 disposed transversely to the axis 30.

The space station 11 is provided with a rigid tunnel structure 35 which is mounted thereon in sealing relationship about an egress hatch of the space station. The tunnel structure 35 comprises a cylindrical portion 35a and an end module 35b which is provided with oppositely disposed hatches 37, 38. The cross section diameter of the cylindrical portion 35a and the opening through the end module 35b are of sufficient size to accommodate the passage of personnel and equipment.

A trunnion structure consisting of three longer on trunnions 41, 42 and 43 and support structure for each is mounted on the tunnel structure 35 and a fourth trunnion 44 is mounted to the base of the docking ring 18 and in the final docked configuration to be hereinafter described constitutes the primary structural tie between the space vehicle 10 and the space station 11. As best seen in FIG. 3, trunnion 43 is mounted on one side of the tunnel structure 35 in position to be received by a trunnion latching mechanism 45 mounted on the wall 22 of the space vehicle's payload bay 12. The trunnions 41, 42 are mounted on the opposite side of the tunnel structure 35 in positions to be received by releasable latching mechanisms 46, 47 on the wall 21 of the payload bay 12. The keel trunnion 44 is mounted in a position to be received by releasable latching mechanism 48 on the keel of the payload bay 12. The latching mechanisms 45, 46, 47, 48 are of a conventional type which are adapted to automatically latch the trunnions when received therein and can be manually or automatically operated to effect a release.

The end module 35b is also provided with docking mechanism components in the form of a docking ring 50 with four alignment fingers 51 which are spaced equiangularly about the ring and extend radially and downwardly therefrom, as shown in FIG. 1, at an angle to the plane of the ring 50. Each of the alignment fingers 51 is broader at its end which connects with the docking ring 50 than at its free end. The docking ring 50 is provided with substantially the same internal and external diameters as those of the docking ring 18.

Similar alignment fingers 55, also four in number, are provided on the docking ring 18 carried on the space vehicle and extend radially and upwardly therefrom as seen in FIG. 1. The two docking rings 18, 50 with alignment fingers 51, 55 are similar to docking components which have been used previously in the docking system provided for the Apollo-Soyuz Program, a joint endeavor of the United States of America and the Union of Soviet Socialist Republics.

To effect a docking of the space shuttle orbiter 10 with the space station 11, the space shuttle 10 uses its guidance and propulsion systems to move into close proximity to the space station 11. Its payload bay doors 15 are opened and the docking ring 18 extended outwardly of the payload bay by operation of the actuator-attenuator devices 20 to be described hereinafter in greater detail. The guidance and propulsion systems of the orbiter are further employed to bring about a substantial alignment of their docking mechanism components, such as shown in FIG. 1. In addition to an axial alignment of the docking rings 18 and 50, there must also be a rotational alignment such that the alignment fingers 51 on the docking ring 50 will interleave with the alignment fingers 55 on the docking ring 18 and such that the hatch 37 on the tunnel structure 35 will be oriented to face towards the bulkhead 58 at the rear of the crew compartment of the space orbiter. As the orbiter makes a docking approach to the space station, the first contact will normally be made by the alignment fingers 51 and 55. Although there will normally be errors in alignment, the alignment must be sufficient that the fingers 51 will generally interleave with the fingers 55. A continued movement of the space shutter 10 towards the space station 11 will correct for errors in rotational alignment since there will be a camming action between the respective side edges of the fingers 51 and 55 which effects a relative rotation of the docking rings 18 and 50. When the annular faces of the docking rings 18 and 50 are in flush contact with one another, the alignment fingers 51 and 55 are interleaved such that further relative rotation of the docking rings is precluded.

When the docking rings 18 and 50 are in flush engagement, a plurality of latching mechanisms 60 are operated by mechanical contact of the rings 18 and 50. In FIG. 3, components of these latches are shown to be disposed on the inner circumference of the docking ring 18 and are actuated by contact with cooperative latching surfaces or latch members on the inner circumference of the docking ring 50. It is to be understood that the precise nature of the latching mechanisms 60 is not critical since many of a variety of latching mechanisms may be employed, as for example, a latching mechanism as shown in U.S. Pat. No. 3,820,741.

The docking ring 18 and the plurality of actuator-attenuators 20 which support it serve the dual function of providing a means for attenuating the shock of docking impact of the space shuttle with the space station and also providing a retraction means whereby the tunnel structure 35 may be berthed within the payload bay of the space vehicle and the docking operation completed. During vehicle launch and operations of the space vehicle which do not involve docking, the docking ring 18 is stowed near the deck of the payload bay in a generally out-of-the-way position. In this position, as shown in FIG. 1, the actuator-attenuators 20 are depressed toward the deck of the payload bay. When the doors 15 of the payload bay are opened in preparation for a docking operation, the docking ring 18 may then be moved by the actuator-attenuators 20 past an intermediate operational position wherein all of the actuator-attenuators 20 are disposed in co-planar relationship to a fully deployed position wherein the docking ring 18 is supported outside the payload bay by full extension of the actuator-attenuators 20.

The actuator-attenuator devices 20 are preferably linear actuators, such as shown in FIG. 6. Each of the devices 20 is comprised of telescoping members 20a, 20b and preferably is of a conventional ball screw type which includes a reversible drive motor 70 adapted to respond to electrical command signals for turning a screw 71 to effect a telescopic movement of the members 20a, 20b in a linear expansion or contraction. The screw 71 extends in coaxial relation to the telescopic member 20b and although adapted for axial rotation is otherwise fixed in position relative to the member 20b. The ball drive mechanism typically includes a plurality of bearing balls 72 which are located in concave helical grooves in the screw 71 and a cylindrical ball nut 73 which is anchored to the inner wall of the telescopic member 20a. Turning of the screw 71 effects a travel of the nut 73 relative to the screw 71 and therefore a linear telescopic movement of the member 20a relative to the member 20b in a direction dependent on the direction of axial rotation of the screw 71.

Figure 8:
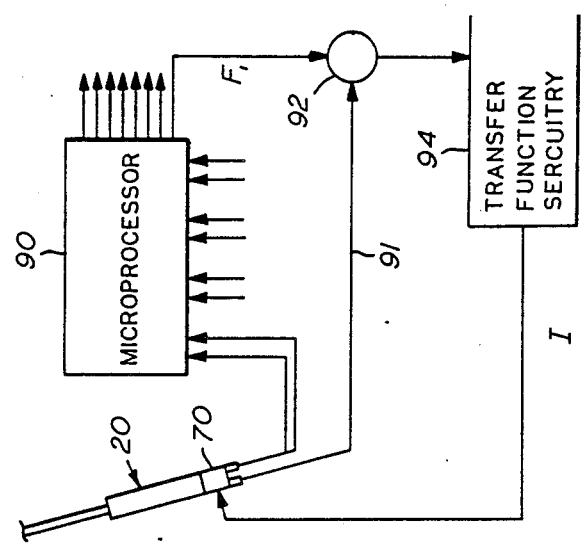
FIG. 8 is a schematic diagram of a computer control system for controlling the actuator-attenuators which are a part of the invention.

The command signals for controlling the actuator-attenuators 20 may be generated by computer logic which receives inputs from load sensors 75 mounted on actuator-attenuator 20. A load sensor 75 and position encoder 76 are mounted on a yoke 78 which receives the bearing of the swivel connection 73 and is rigidly connected to the motor housing and the telescopic member 20b. The load sensor detects axial loads on the actuator-attenuator 20 and the position encoder 76 senses the extent of telescopic movement of the members 20a, 20b and hence the stroke of the actuator-attenuator 20. A cable 79 interconnects the sensors 75 and position encoders 76 with a control system as shown in FIG. 8, the command signals of which are delivered to the drive motor 70 via the same cable 79. The control system includes a microprocessor computer 90 for receiving the load sensor and position encoder signals from each actuator-attenuator 20 and generating an output signal ($F_1$-$F_8$) for each device 20. Each computer output signal is combined in a summer 92 with a feedback signal from the associated actuator-attenuator 20 delivered via a conductor 91. The summer output is delivered to transfer function circuitry 94 which produces an output current signal I for driving the motor 70. It is to be noted that the eight output signals from the computer 90 are similarly processed to produce eight current signals for driving the motor 70 of each actuator-attenuator 20.

With reference to FIG. 1, it will be readily seen that in moving the orbiter's docking ring 18 from its stowed position adjacent the deck of the payload bay, the actuator-attenuators 20 are telescopically compacted which results in their pivotal movement to a position wherein all of the actuator-attenuators 20 and the docking ring are in co-planar relation in a defined plane such as the plane 80. To insure that the actuator-attenuators 20 continue their pivotal movement through this co-planar position, an "overcenter" drive motor 81 is provided for each actuator-attenuator 20. Each drive motor 81 is mounted to a wall 21 or 22 of the payload bay by a brace 82 located closely adjacent the brace 25 which supports the actuator-attenuator 20. When all of the actuator-attenuators 20 reach their co-planar relation, the motor 81 serves the purpose of avoiding a "null" by continuing the pivotal movement of the actuator-attenuator 20 and driving the docking ring 18 on through the defined plane 80. Each "overcenter" motor 81 is provided with its own flexible output shaft 83 which connects to the yoke member 78 of the actuator-attenuator and is adapted to impart pivotal movement thereto in a manner which insures that the actuator-attenuator will move through the plane 80. In moving the docking ring 18 from its stowed position, the actuator-attenuators 20 are initially telescopically retracted and on reaching the defined plane 80 and passing therethrough are then linearly expanded by appropriate command signals whereby their pivotal movement is continued and the docking ring 18 reaches its fully deployed position outside the payload bay of the space vehicle.

It is to be appreciated that the initial coupling of the docking mechanism components on the orbiter 10 with those on the space station 11 produces substantial impact forces dependent on the closing velocity of the space vehicle and space station and their respective masses which must be attenuated to avoid serious damage. The plurality of actuator-attenuators 20 provide the function of absorbing the initial loading at impact through a relatively long attenuation stroke which is possible because of the relatively large base of the attenuation system's geometry (spanning the entire width of the payload bay 12). This is accomplished by a simultaneous contraction of each of the actuator-attenuators 20 upon the sensing of docking impact by its associated drive motor 70 to turn its drive screw 71 and effect a compaction of the linear actuator and a movement of the docking ring 18 towards its equilibrium position to a degree proportional to the impact loading.

Once a coupling of orbiter and space station has been effected and docking impact attenuated, it is necessary to retract the two spacecraft whereby the tunnel structure 35 is moved to a berthed position in the payload bay 12. It is an important feature of the invention, that retraction is accomplished by the same actuator-attenuator devices 20 which comprise the impact attenuation system. Retraction is initiated by command signals to each of the actuator-attenuators 20 and retraction continues until the trunnions 41, 42, 43 on the tunnel structure 35 and trunnion 44 on the docking ring 18 are received and latched by the trunnion latching mechanisms 45, 46, 47, 48.

Figure 4:
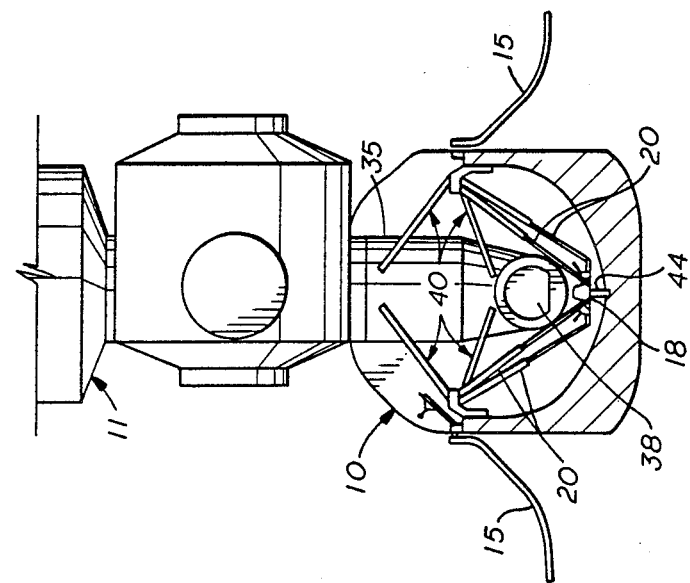
FIG. 4 is a view similar to FIG. 2 but showing the space shuttle orbiter and space station retracted by the invention into a final docked orientation wherein the tunnel structure mounted on the space station is berthed in the payload bay of the orbiter for accommodating the passage of personnel and cargo.

At the completion of retraction, the tunnel structure is in berthed position in the payload bay as shown in FIGS. 4 and 6. A sealing relationship is then established between the tunnel hatch 37 and a hatch or hatch adapter 88 provided on the bulkhead 58 of the space vehicle's crews cabin 13 by operation of appropriate hold-down and sealing mechanisms (not shown) either automatically or manually by the space vehicle crew. Pressurization of the tunnel may then be effected and hatches opened to provide a transfer tunnel suitable for the passage of personnel, cargo and equipment between the docked spacecraft.

It will therefore be seen that a novel spacecraft docking mechanism is disclosed herein which provides important advantages in comparison with other spacecraft docking concepts. A unique arrangement of actuator-attenuator devices in connection with and support of a docking ring carried on the space vehicle makes possible a very large attenuation stroke for absorption of docking impact and correspondingly lighter and less bulky support devices and docking mechanism components. In addition, the mounting of the pressurizable tunnel structure and docking module on the space station, eliminates the need for carrying these structures on every vehicle mission where docking operations are contemplated. Accordingly, the associated weight saving significantly increases the cargo carrying of the space vehicle and reduces the required fuel expenditures. Furthermore, since the impact attenuation and retraction capabilities are incorporated in a single system there is further over-all weight saving.

It is also to be noted that there are no active mechanisms on the space station which are required for a docking operation. The tunnel structure, docking ring and alignment guide fingers, and trunnion structure mounted thereon are passive structures which do not require continuous maintenance. Furthermore, while the invention has been described as a docking mechanism for the docking of a space vehicle to a space station, it is also appropriate for use in the docking of one space vehicle to another space vehicle. It can also be easily adapted for use as a docking mechanism where a tunnel connection is not a requirement.

While the foregoing description of a preferred embodiment of the invention has been presented for purposes of illustration and explanation, it is to be understood that it is not intended to limit the invention to the precise form disclosed. For example, the actuator-attenuator devices 20 could be hydraulic rather than ball-screw mechanisms and conical probe and drogue type coupling mechanisms could be used in lieu of docking rings 18 and 50. It is to be appreciated therefore, that various structural changes, many of which are suggested herein, may be made by those skilled in the art without departing from the spirit of the invention.

I claim:

1. A docking mechanism for the coupling and docking of a space vehicle with a space station which is provided with an egress hatch, said docking mechanism comprising:

a pressurizable tunnel structure attached at one end to said space station in sealing engagement therewith about said egress hatch, said tunnel structure providing a passageway of a size sufficient for accommodating the passage of personnel and equipment;

a passive docking ring affixed to said tunnel structure at a location thereon remote from said one end;

an active docking ring mounted on said space vehicle;

actuator means for moving said active docking ring between a stowed retracted position in the payload bay of the spaced vehicle to a fully deployed position outside said space vehicle wherein said active docking ring is disposed for coupling engagement with the passive docking ring in the space station when the space vehicle makes an aligned docking approach to the space station, said actuator means being responsive to the docking impact of said space vehicle with the space station to attenuate the shock forces of said impact and after completing engagement retracting the docket and assembly;

and means responsive to retraction of the active docking ring after coupling engagement of said docking rings for establishing a structural tie between said space vehicle and space station and sealing connection of said tunnel structure with said space vehicle for establishing a passageway for the passage of personnel and equipment between the space vehicle and space station.

2. A docking mechanism as set forth in claim 1 wherein said actuator means comprises a plurality of elongate linearly expansible actuator devices, each said device having one end attached by a swivel connection to said active docking ring and its other end attached by a swivel connection to the space vehicle in said payload bay and being movable between a first extreme of pivotal movement wherein the active docking ring is in its stowed position and a second extreme of pivotal movement wherein the active docking ring is in its fully deployed position.

3. A docking mechanism as set forth in claim 2 further including means for sensing and signalling the impact loadings on each of said linear actuator devices upon a docking impact of the space vehicle with the space station, and wherein said actuator means is responsive to signals from said sensor means for attenuating said docking impact by linear contraction of said plurality of actuator devices.

4. A docking mechanism as set forth in claim 1 wherein said means responsive to retraction of the active docking ring for establishing a structural tie between the space vehicle and space station comprises a plurality of trunnions affixed to said tunnel structure by trunnion supporting structure and a plurality of trunnion latching mechanisms mounted on said space vehicle which are responsive to engagement by said trunnions in the fully retracted position of the active docking ring for securing the trunnions and establishing a structural tie between the space vehicle and space station.

5. A docking mechanism as set forth in claim 2 wherein each of said linearly expansible actuator devices is comprised of a pair of linearly adjustable telescopic members with a ball-screw drive mechanism responsive to electrical signals for controlling the linear adjustment of the telescopic members and the pivotal movement of the actuator device with respect to the active docking ring and the space vehicle to deploy or retract the active docking ring.

6. A docking mechanism as set forth in claim 2 wherein said plurality of actuator devices are connected to the space vehicle at attachment points in substantially co-planar relationship and are adapted to pass in pivotal movement through an intermediate position between said first and second extreme position wherein said active docking ring and plurality of elongate linearly expansible actuator devices are in substantially co-planar relationship, and drive means are provided for detecting the arrival of the actuator devices and said active docking ring in said intermediate position and continuing the pivotal movement of said actuator devices to pass through said intermediate position to avoid a null condition.

7. A docking mechanism for the coupling and docking of a space vehicle having a payload bay with a space station having an egress hatch, said docking mechanism comprising:

a passive docking structure mounted on said space station, said passive docking structure comprising a tunnel structure attached at one end in sealing relationship with the space station about the egress hatch thereof, and a passive docking ring affixed to the tunnel structure at the other end thereo an active docking structure mounted on the space vehicle, said active docking structure comprising an active docking ring;

actuator means for moving said active docking ring between a stowed position on the payload bay of the space vehicle to a fully deployed position outside said space vehicle wherein said active docking ring is disposed for coupling engagement with the passive docking ring on the space station, said actuator means including impact attenuation means for absorbing the impact of the space vehicle with the space station upon contact and coupling of said active and passive docking ring, and means operative after coupling of said space vehicle and space station for retracting said active docking ring to its stowed position wherein the tunnel structure is inserted in berthed position in the payload bay of the space vehicle;

cooperative means on said space vehicle and space station for structurally tieing the space vehicle to the space station when the tunnel structure is in said berthed position; and hatch means on said tunnel structure and said space vehicle for establishing communication therebetween when the tunnel structure is in the berthed position.

8. A docking mechanism for the coupling and docking of a space vehicle with a space station which is provided with an egress hatch, said docking mechanism comprising:

a passive docking ring mounted on said space station;

an active docking ring mounted on said space vehicle;

actuator means for moving said active docking ring between a stowed retracted position in the payload bay of the space vehicle to a fully deployed position outside said space vehicle wherein said active docking ring is disposed for coupling engagement with the passive docking ring on the space station when the space vehicle makes an aligned docking approach to the space station, said actuator means comprising a plurality of elongate linearly expansible actuator devices, each said device having one end attached by a swivel connection to said active docking ring and its other end attached by a swivel connection to the space vehicle in said payload bay and being movable between a first extreme of pivotal movement wherein the active docking ring is in its stowed position and a second extreme of pivotal movement wherein the active docking ring is in its fully deployed position;

impact attenuation means comprising said plurality of elongate linearly expansible actuator devices for attenuating and absorbing the docking impact of said space vehicle with said space station;

means for coupling said active and passive docking rings upon contact therebetween; and means comprising said plurality of elongate linearly expansible devices which is operative after coupling of said docking rings for retracting said active docking ring to its stowed position and retracting said space vehicle and space station to a final docked configuration.

9. A docking mechanism as set forth in claim 8 wherein each of said linearly expansible actuator devices is comprised of a pair of linearly adjustable telescopic members with a ball-screw mechanism responsive to electrical signals for controlling the linear adjustment of the telescopic members and the pivotal movement of the actuator device with respect to the active docking ring and the space vehicle to deploy or retract the active docking ring.

10. A docking mechanism as set forth in claim 8 wherein said plurality of actuator devices are connected to the space vehicle at attachment points in substantially co-planar relationship and are adapted to pass in pivotal movement through an intermediate position between said first and second extreme positions wherein said active docking ring and plurality of elongate linearly expansible actuator devices are in substantially co-planar relationship, and drive means are provided for detecting the arrival of the actuator devices and said active docking ring in said intermediate position and continuing the pivotal movement of said actuator devices to pass through said intermediate position to avoid a null condition.

11. A docking mechanism as set forth in claim 8 wherein said impact attenuation means includes means for sensing and signalling the impact loadings on each of said linear actuator devices upon a docking impact of the space vehicle with the space station, and wherein said actuator means is responsive to signals from said sensor means for attenuating said docking impact by linear contraction of said plurality of actuator devices.

* * * * *